June 17, 1952 W. RABKIN 2,600,573

SOUND RECORD DISK

Filed Aug. 14, 1946

INVENTOR.
WILLIAM RABKIN
BY Edwin [signature]
ATTORNEY

Patented June 17, 1952

2,600,573

UNITED STATES PATENT OFFICE 2,600,573

SOUND RECORD DISK

William Rabkin, New York, N. Y.

Application August 14, 1946, Serial No. 690,489

1 Claim. (Cl. 274—42)

This invention relates to sound-record disks more particularly to sound-record disks for use in sound-recording machines.

In sound-recording machines the sound-record disks are disposed one on top of the other in a supply stack from which they are individually moved to the turntable for the sound-recording operation. When the means for moving the disks one at a time from the supply stack to the turntable is suction operated, for example, as in the machine shown by the Lissiansky Patent No. 2,342,411, it sometimes happens that the suction operated means picks up more than one sound-record disk from the supply stack, usually two disks instead of one, and either releases the second disk at some point between the stack and the turntable or transfers both disks to the turntable, thus in either case interfering with the proper operation of the machine. This defective operation occurs more frequently when the temperature in the cabinet of the machine is rather high, for example, in the southern part of this country or other regions having a hot climate, since the disks, especially when the latter have lacquered surfaces tend to stick to each other in the supply stack, due to the partial softening of the lacquer. Moreover, since the surfaces of the non-recorded disks in the supply stack are flat and smooth, it sometimes happens that there is insufficient air between the adjacent surfaces of the two uppermost disks of the supply stack to enable the suction operated disk-transfer means to operate properly for removing only the uppermost disk from the supply stack. Of course this condition is aggrevated by the first mentioned condition resulting from the tendency of the disks to stick to each other when the surfaces of the disks are softened by heat.

The primary object of the present invention is to obviate the above mentioned difficulties and objections in connection with the transfer of sound-record disks from the supply stack to the turntable.

The above and other objects, features, and advantages of the present invention will be fully understood from the following description considered in connection with the accompanying illustrative drawings.

Figure 1:
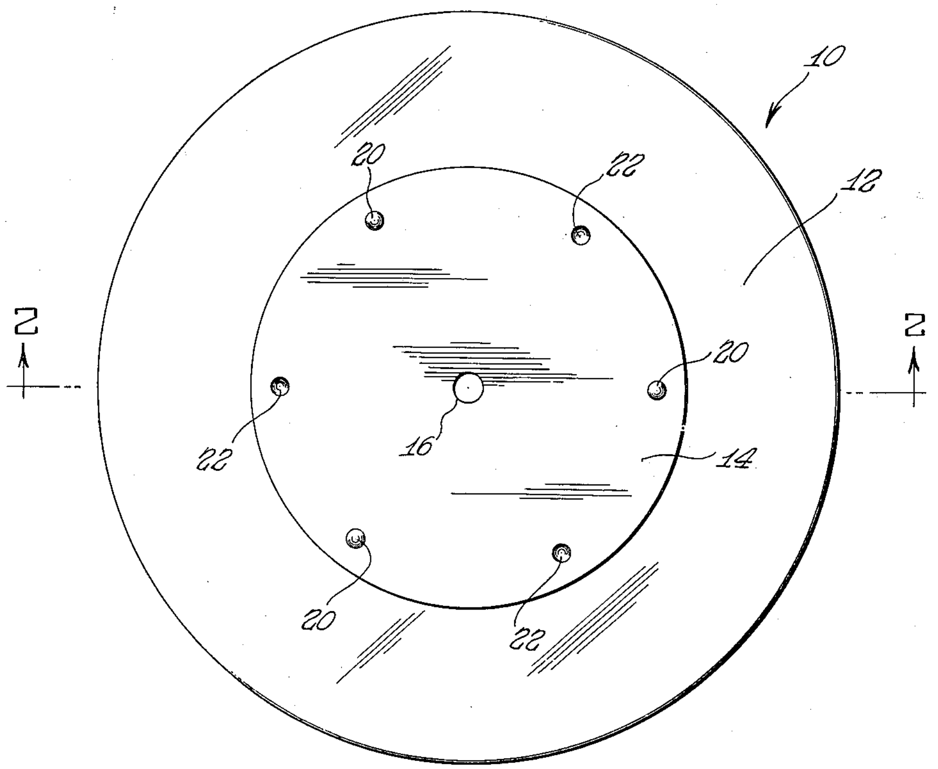
Fig. 1 is a plan view of a sound-record disk embodying the invention.
Figure 2:
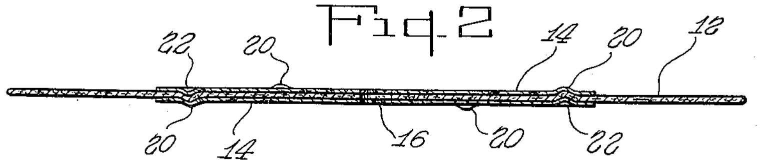
Fig. 2 is a sectional view on the line 2—2 of Fig. 1.
Figure 3:
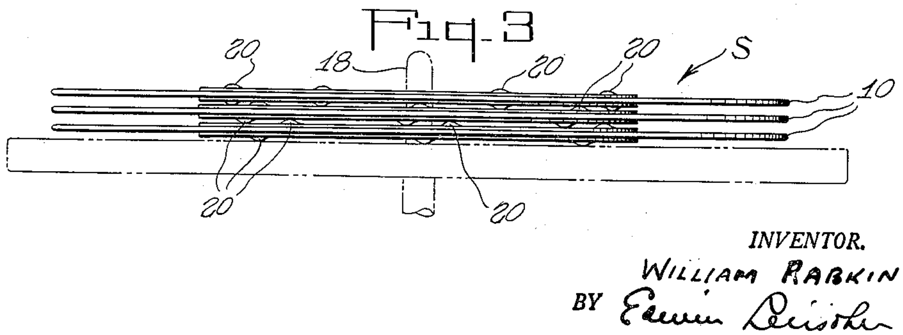
Fig. 3 is a view showing several of the records in stacked relation in a supply stack.

Referring now to the drawings in detail, there is shown a sound-record disk 10 embodying the present invention; said disk may be made of any suitable material. A conventional type of disk which is used in the machine shown by the above mentioned patent is formed of paper or thin cardboard coated with a lacquer in which the sound groove is cut by the needle of the sound-recording device. Numeral 12 indicates the part or area of the disk in which the sound-record is made. Beyond this area, here specifically shown at the center of the disk, there are thin paper labels 14 secured to the disk at both surfaces thereof. As usual, the disk is provided with a central opening 16 for the centering spindle of the turntable, as well as for the centering spindle 18 of the support for the supply stack indicated at S in Fig. 3.

In accordance with the present invention, the sound-record disks 10 are provided with means for spacing the disks slightly from each other in the supply stack. As here shown, the means provided for this purpose comprises a series of projections 20 arranged in the area of the disk beyond the sound-recording area 12 thereof. Preferably, as here shown, there are a plurality of projections 20 on each side of the disk so that it is unnecessary to orient the disks in any particular relation in the stack. In this connection, it will be understood that if the projections were formed on only one side of the disk, a number of disks might be placed in the stack with two adjacent disks in abutting surface to surface relation, and that this result is prevented without any special care being taken in placing the records in the stack. As illustrated, the projections 20 are disposed in circumferentially spaced relation, and preferably there are at least three projections at each side of the disk.

The projections 20 may be formed in the disk in any suitable way but are preferably formed in a machine by a punching operation which result in the formation of recesses 22 at one side of the disk at the points of the projections, respectively, at the opposite side of the disk. As the recesses 22 are smaller than the companion projections 20, due to the thickness of the material of the disk, the disks do not touch each other in the stack, except at the points of the projections, even if, fortuitously, the disks of the stack should happen to be so disposed that the recesses of one disk register with the projections on the confronting surface of the adjacent disks. In order, however, to prevent or reduce to a negligible factor the possibility of such registration of projections with recesses, the projections 20 are unequally spaced from each other circumferentially of the companion disk. Further it will be observed that the projections 20 and recesses 22 are covered by the corresponding portions of labels 14 and that said projections of one record disk engage the adjacent record disks in the stack at the parts of the records which are covered by the labels so that even if the lacquer softens or becomes sticky there is no possibility of adjacent records sticking to each other. It will be understood, however, that the present invention is not limited to record disks of the specific type hereinbefore described but applies generally to record disks for spacing them from each other in the stack, for example to sound-record disks made of metal or of a synthetic resin composition, etc.

It will be understood that it is within the scope of the invention to vary the number of projections and that said projections may be non-circular instead of circular as illustrated. Further, it will be understood that the invention may be embodied in various other forms without departing from the underlying idea or principles of the invention within the scope of the appended claim.

Having thus described my invention, what I claim and desire to secure by Letters Patent, is:

A sound-record disk having means for spacing the disk from the confronting surfaces of adjacent similar disks when a plurality of such disks are disposed in superimposed coaxial relation in a stack, said means comprising at least three projections extending from at least one surface of the disk, the opposing surface of the disk being provided opposite each of the respective projections with a recessed portion, respectively, defined therein, said projections being in unequal spaced relation circumferentially of the disk and said recessed portions being smaller than said projections for maintaining the spacing between confronting surfaces of adjacent disks in the event that the recesses of a disk register with the projections on the confronting surface of an adjacent disk.

WILLIAM RABKIN.

REFERENCES CITED

The following references are of record in the file of this patent:

UNITED STATES PATENTS

| Number | Name | Date |
|---|---|---|
| 143,608 | Barker | Oct. 14, 1873 |
| 850,494 | Sanders | Apr. 16, 1907 |
| 877,842 | Higley | Jan. 28, 1908 |
| 1,675,852 | Geer | July 3, 1928 |
| 1,804,453 | Basseches | May 12, 1931 |
| 1,863,683 | Bowles | June 21, 1932 |
| 2,092,668 | Goldsmith | Sept. 7, 1937 |
| 2,544,010 | DiGiannantonio | Mar. 6, 1951 |

FOREIGN PATENTS

| Number | Country | Date |
|---|---|---|
| 8,122 1909 | Great Britain | Aug. 26, 1909 |
| 337,731 | Great Britain | Nov. 3, 1930 |
| 124,508 | Austria | Sept. 25, 1931 |